UNITED STATES PATENT OFFICE.

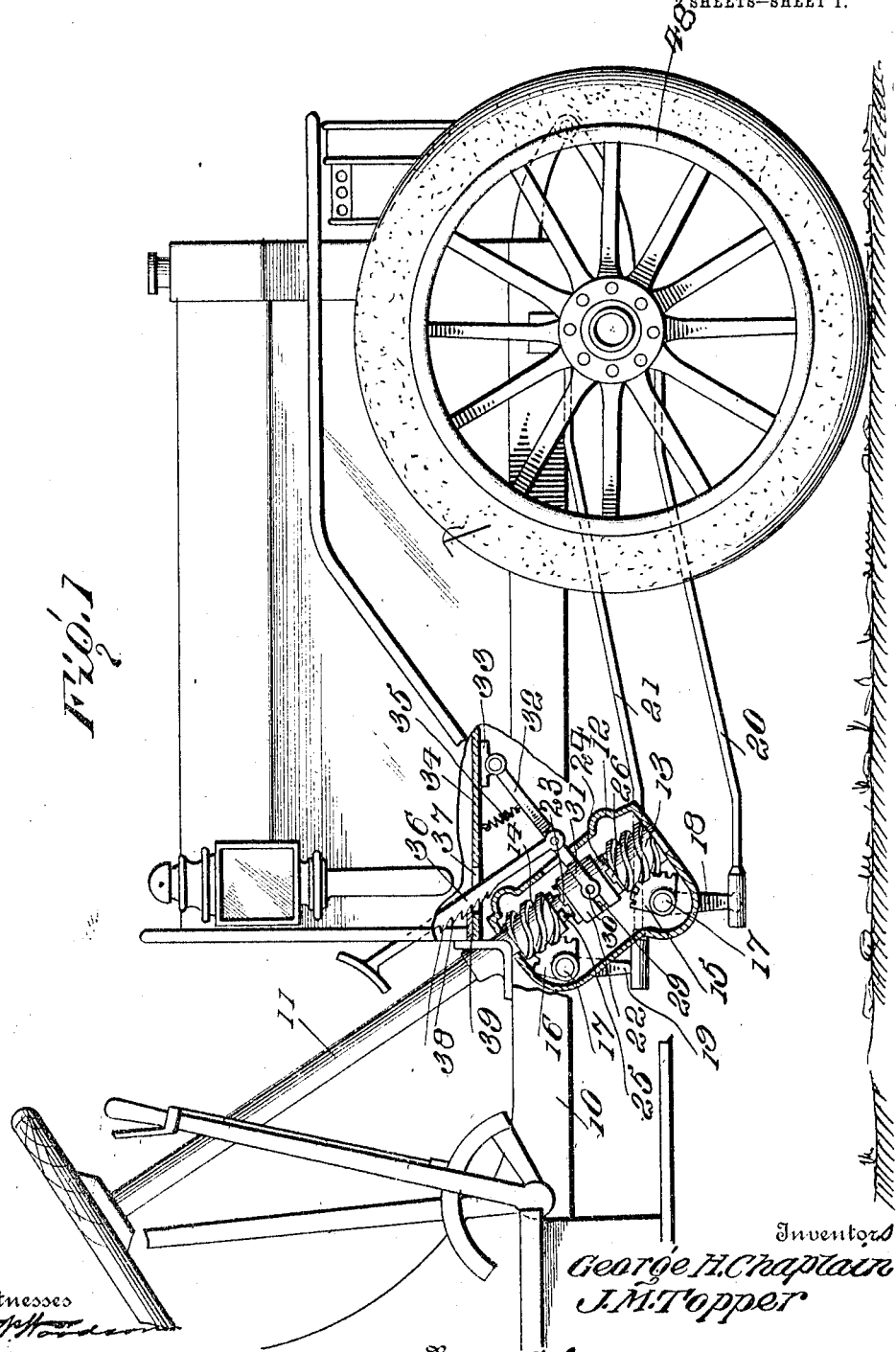

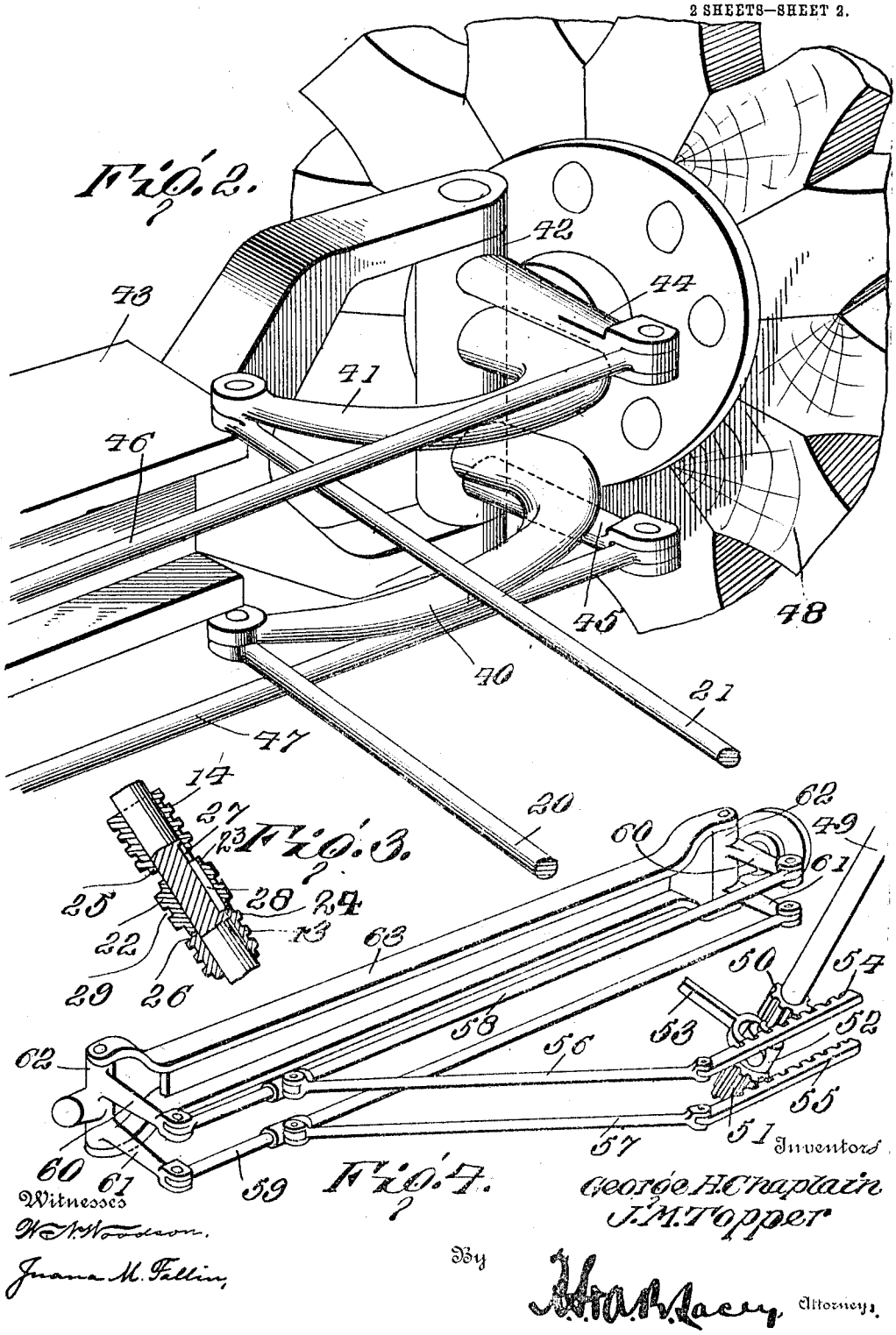

JOHN M. TOPPER AND GEORGE H. CHAPLAIN, OF LEAVENWORTH, KANSAS.

AUXILIARY STEERING DEVICE.

1,020,465.  Specification of Letters Patent.  Patented Mar. 19, 1912.

Application filed April 9, 1910, Serial No. 554,571. Renewed August 1, 1911. Serial No. 641,698.

*To all whom it may concern:*

Be it known that we, JOHN M. TOPPER and GEORGE H. CHAPLAIN, citizens of the United States, residing at Leavenworth, in the county of Leavenworth and State of Kansas, have invented certain new and useful Improvements in Auxiliary Steering Devices, of which the following is a specification.

This invention relates to steering mechanism and has for an object to provide a vehicle, aeroplane, or the like with two separate mechanisms for steering the same which can be alternately thrown into or out of operation at the will of the operator.

The invention aims to provide a steering mechanism with a reserve or safety device which may be thrown into operation when the main steering mechanism is broken or otherwise rendered inoperative, and to thereby insure the complete control of the steering road-wheels of the vehicle.

For a full understanding of the invention reference is to be had to the following description and accompanying drawings, in which:—

Figure 1 is a side elevation partly in section of the forward end of a motor vehicle having the improved apparatus applied thereto. Fig. 2 is a detail perspective view of one end of the front axle disclosing the connections of the steering device to the steering road wheel. Fig. 3 is a detail view of the steering post and the clutch-sleeve which is mounted thereon, and Fig. 4 is a detail perspective view of a modification of the device.

Corresponding and like parts are referred to in the following description and indicated in all the views of the drawings by the same reference characters.

Referring to the drawings the numeral 10 designates the frame of a motor vehicle which is provided in the usual manner with a steering post 11. The lower end of the steering post 11 extends through the frame 10 and into a suitable housing 12, in the opposite ends of which it is suitably journaled. Loosely disposed for rotation about the post 11 are a pair of spaced worms 13 and 14 which respectively mesh with sectors 15 and 16 keyed upon spindles 17 transversely journaled within the housing 12. The spindles 17 extend through one side of the housing 12 and carry, in rigid relation thereon, arms 18 and 19 depending against the side of the housing. The lower ends of the arms 18 and 19 are pivotally connected respectively to the rear extremities of the connecting rods 20 and 21. The arms 18 and 19 are keyed to the spindles 17.

The steering post 11 is provided with a sliding clutch-sleeve 22 in the opposite ends of which are formed teeth 23 and 24 for alternate engagement with teeth 25 and 26 which are respectively formed upon the loose worms 14 and 13 at their inner ends. The post 11 is provided with a longitudinal slot 27 for the reception of a key 28 which is carried upon the inner face of the clutch-sleeve 22. This arrangement admits of the longitudinal movement of the sleeve 22 upon the post 11 but effects the rigid rotation of the sleeve with the post. The sleeve 22 is provided midway of its ends with a peripheral groove 29 into which are extended pins 30 carried in the extremities of a yoke 31 which is engaged against one side of the sleeve 22. The yoke 31 is rigidly carried upon the lower end of a shifting lever 32 which is pivoted at its upper extremity upon a block 33. The block 33 is secured against the under face of a brace 34 suitably mounted in the frame 10. A spring 35 is disposed between the brace 34 and the shifting lever 32 for drawing the lever 32 upwardly to engage the sleeve 22 with the worm 14. A suitable lever 36 is hinged at its lower end centrally upon the shifting lever 32 and extends upwardly through an elongated slot 37 formed in the brace 34 to a point adjacent the foot of the operator. The foot lever 36 carries a plurality of ratchet teeth 38 for engagement with a dog 39 which is positioned upon the brace 34 and extends over the slot 37. In Fig. 1 the foot lever 36 is disclosed in a depressed position having the teeth 38 engaged with the stop 39 to hold the shifting lever 32 in a downward position against the tension of the spring 35. When the shifting lever is in this position, the sleeve 22 is engaged against the worm 13 and interlocks the worm 13 with the post 11.

The connecting rods 20 and 21 extend forwardly beneath the frame 10 and are respectively connected to connecting arms 40 and 41 which are carried upon a steering knuckle 42. As disclosed in Fig. 2 of the drawings the connecting arms 40 and 41 extend inwardly from the steering knuckle 42 and are so curved as to position their extremities beyond the upper and lower faces of the axle 43 to admit of the free rotation of the steering knuckle 42. If desired, the connecting arms may be projected forwardly or in other convenient positions, according to the structure of the vehicle, or other devices to which the improved mechanism is attached. The steering knuckle 42 is further provided with a pair of spaced steering arms 44 and 45 which extend rearwardly therefrom and are suitably connected to the extremities of steering cross-rods 46 and 47 respectively. The arms 44 and 45 and the steering cross-rods 46 and 47 may be located forwardly of the axle 43 or against the opposite sides of the same, as is found desirable, without departing from the spirit of the invention.

From this construction it is readily observed that the vehicle or other device to which the improved mechanism is applied is provided with two separate steering devices which may be alternately connected to the steering post 11 through the medium of the sliding clutch 22. In Fig. 1 the lower steering device is disclosed in connection with the post 11 so that when the post 11 is rotated the clutch sleeve 22 is turned therewith so that the worm 13 is actuated to swing the sector 15 and the arm 18 into the desired angle. The arm 18 moves the connecting rod 20 therewith to throw the connecting arm 40 into the desired angle to swing the steering knuckle which carries the steering road-wheel 48. Should this steering mechanism break or be otherwise rendered inoperative and the operator desire to gain control of the machine he forces the foot lever 36 forwardly, depressing the same slightly to raise the teeth 38 from the dog 39 and to admit of the action of the spring 35 upon the shifting lever 32. The shifting lever 32 raises the clutch-sleeve 22 into engagement with the worm 14 to lock the worm to the post 11. The upper steering device is now brought into action and the broken parts of the lower steering device can in no way interfere with the operation thereof.

The modified form of the device as disclosed in Fig. 4 comprises a steering post 49 having spaced pinions 50 and 51 loosely mounted for rotation upon its lower end, and which carries for sliding engagement between the pinions 50 and 51 a clutch-sleeve 52. The clutch-sleeve 52 is formed similar to the clutch-sleeve 22 in the preferred form and is vibrated between the pinions 50 and 51 through the medium of the shifting lever 53. A pair of racks 54 and 55 are arranged for meshed relation against the pinions 50 and 51 respectively. The inner extremities of the racks 54 and 55 are hinged to connecting rods 56 and 57 which extend forwardly to a point adjacent which the opposite side of the vehicle where they are pivotally secured to the steering cross-rods 58 and 59. The steering cross-rods 58 and 59 are connected at their opposite extremities upon the spaced steering arms 60 and 61 which are carried by the steering knuckles 62. The steering knuckles 62 are disclosed in the drawings as being supported upon the opposite extremities of an axle 63. In a like manner the steering arms 60 and 61 and the steering cross-rods 58 and 59 may be arranged forwardly or against the opposite sides of the axle 63. In this modified form it is readily observed that should the upper or lower steering mechanisms become inoperative that the clutch-sleeve 52 may be fitted to the opposite pinion and throw the unimpaired device into operation.

Having thus described the invention what is claimed as new is:—

A steering device including a frame, a post carried by the frame, spaced actuating members upon the post, separate steering devices connected to the actuating members, a sliding clutch keyed to the post between said actuating members, a shifting lever carried by the frame for moving the clutch alternately into engagement with said actuating members, a yoke formed upon the lower end of the shifting lever and engaged with said clutch, a foot lever hinged to the shifting lever and extending upwardly through the frame, teeth formed upon the edge of said foot-lever and a stop carried by the frame for engagement with said teeth to lock the foot-lever in a depressed position.

In testimony whereof, we affix our signatures in presence of two witnesses.

JOHN M. TOPPER. [L. S.]
GEORGE H. CHAPLAIN. [L. S.]

Witnesses:
EARL DOUGLASS,
HOWARD H. FISHER.